United States Patent [19]
Tanaka

[11] Patent Number: 5,838,132
[45] Date of Patent: Nov. 17, 1998

[54] STEPPER-MOTOR CONTROL METHOD

[75] Inventor: Makoto Tanaka, Nagaokakyo, Japan

[73] Assignee: Murata Kikai Kabushiki Kaisha, Kyoto, Japan

[21] Appl. No.: 954,027

[22] Filed: Oct. 20, 1997

Related U.S. Application Data

[63] Continuation of Ser. No. 612,447, Mar. 7, 1996, abandoned.

[30] Foreign Application Priority Data

Mar. 10, 1995 [JP] Japan ................................. 7-050900

[51] Int. Cl.⁶ .................................................. G05B 19/40
[52] U.S. Cl. .................. 318/685; 318/696; 318/798–815;
318/254; 318/138; 318/439; 318/432–434;
318/609; 318/610; 388/906; 388/930
[58] Field of Search ..................................... 318/685, 696,
318/798–815, 254, 138, 439, 432–434,
609, 610; 388/906, 930

[56] References Cited

U.S. PATENT DOCUMENTS

| | | | |
|---|---|---|---|
| 3,965,403 | 6/1976 | Okado | 318/432 X |
| 4,129,131 | 12/1978 | Hosokawa et al. | 318/685 |
| 4,556,830 | 12/1985 | Schwalm et al. | 318/696 X |
| 4,745,991 | 5/1988 | Tanahashi | 318/798 X |
| 4,980,623 | 12/1990 | Anton | 318/432 |
| 5,053,688 | 10/1991 | Rees | 318/254 X |
| 5,097,189 | 3/1992 | Ito et al. | 318/685 |
| 5,175,483 | 12/1992 | Fuji et al. | 318/807 |
| 5,309,075 | 5/1994 | Yokoe et al. | 318/798 X |
| 5,389,749 | 2/1995 | Hokari et al. | 318/798 X |
| 5,424,960 | 6/1995 | Watanabe et al. | 318/696 |
| 5,550,445 | 8/1996 | Nii | 318/254 X |

*Primary Examiner*—Karen Masih
*Attorney, Agent, or Firm*—Armstrong, Westerman, Hattori, McLeland & Naughton

[57] ABSTRACT

A device for outputting a suitable rotation torque relative to a load torque or actual torque exerted on a stepper-motor when the stepper-motor is used as a drive of an image processing device. The output torque of the stepper-motor depends on a supply current to the stepper-motor. CPU determines a suitable supply current using a table in ROM so that the stepper-motor is able to rotate at an optimum rotation torque. To this end, CPU sends a particular signal to the motor driver so that an appropriate supply current is supplied to the excitation phases A/B of the stepper-motor. The CPU determines the load torque based on an integrated current fed to the stepper-motor during a particular period. The CPU calculates difference between the load torque and rotation torque and determines the signal to be applied to the motor driver based on the torque difference.

1 Claim, 5 Drawing Sheets

STEPPER-MOTOR CONTROL METHOD

This application is a continuation of application Ser. No. 08/612,447 filed Mar. 7, 1996, now abandoned.

BACKGROUND OF THE INVENTION

1. Field of the Invention

This invention relates to a method for controlling an output torque of a stepper-motor in response to a load torque or actual torque of the stepper-motor.

2. Description of Related Art

Conventionally, in an image processing device, a stepper-motor is used as a drive for transport of paper. The stepper-motor has a plurality of excitation phases or coils, and when a certain pulse signal is input, it is forced to rotate only by a predetermined step angle upon transferal of the current flowing in the coils from a previous phase to a current phase. Upon transmission of rotation of the stepper-motor to a paper transportation roller, the paper is transported inside the image processing device.

However, when a current is supplied to the stepper-motor and rotation of the stepper-motor starts, a load torque is exerted on the stepper-motor from a group of elements to be rotated by the stepper-motor. If various kinds of paper are transported, the load torque changes due to the thickness and material of the paper being transported. Due to this, it is necessary to enable the stepper-motor to always be able to output a rotation torque greater than the expected largest load torque. Otherwise, the stepper-motor could not move thick or heavy paper. A problem with using this kind of stepper-motor is that the power expenditure of the image processing device becomes large.

On the other hand, when thin or light paper is transported by the stepper-motor, the load torque exerted on the stepper-motor may be minimum. In this case, the output torque from the stepper-motor is excessive so that vibration occurs and noise is generated. In addition, if the output torque is excessive compared to the load torque, synchronisation of the motor is lost due to resonance so that the motor becomes unable to correctly rotate. As a result, "step-out phenomena" (inability to transport the paper) is likely to occur.

SUMMARY OF THE INVENTION

An object of the present invention is to solve the above problems.

According to one aspect of the present invention, there is provided a method of controlling the stepper-motor including the steps of detecting the load torque exerted on the stepper-motor during running of the stepper-motor, comparing the load torque with an output torque of the stepper-motor to determine the difference therebetween and controlling the amount of current supplied to the stepper-motor based on the torque difference such that the stepper-motor generates an appropriate output torque relative to the load torque.

By controlling the amount of current supplied to the stepper-motor, the output torque of the stepper-motor increases or decreases: it increases upon raising of the amount of supplied current and decreases upon reducing of the supplied current. The supplied current is increased if the output torque is less than, equal to or only slightly greater than the load torque. The output torque should be larger than the load torque with an appropriate margin. The supplied current is reduced if the output torque is too much larger than the load torque. The current is dropped to a level where vibration of the stepper-motor does not occur and no noise is generated. Therefore, the difference between the load torque (i.e., actual torque) and output torque is always maintained to a suitable value or in a appropriate range.

The load torque may be determined from an integrated amount of current fed to the stepper-motor during a particular period. If there are two phases and excitation patterns of these phases change at different timing, the above-mentioned particular period is from change of the excitation pattern of one phase to change of that of the other phase.

According to another aspect of the present invention, there is provided a method of controlling the stepper-motor including the steps of detecting the load torque exerted on the stepper-motor during running, comparing the load torque with an output torque of the stepper-motor to determine the difference therebetween and controlling the pulse speed of the stepper-motor based on the torque difference such that the stepper-motor can generate the most appropriate output torque relative to the load torque.

By controlling the pulse speed of the stepper-motor, the output torque of the stepper-motor is increased or decreased: it is increased upon dropping of the pulse speed and decreased upon raising of the pulse speed. The pulse speed is lowered if the output torque is smaller, equal to or only slightly larger than the load torque. The output torque should be larger than the load torque at an appropriate difference. The pulse speed is raised if an excessive output torque is produced from the stepper-motor with respect to the load torque. The pulse speed is increased to a level where neither vibration nor noise is generated. In short, the pulse speed of the stepper-motor is controlled if the torque difference is not in a desired range. Therefore, the difference between the load torque (i.e., actual torque) and output torque is always maintained to a suitable value or in a appropriate range.

The load torque may be acquired from an integrated amount of current supplied to the stepper-motor during a particular period.

BRIEF DESCRIPTION OF THE ACCOMPANYING DRAWINGS

DETAILED DESCRIPTION OF THE PREFERRED EMBODIMENTS

Now, preferred embodiments of the present invention will be described with reference to the accompanying diagrams.

Figure 1:
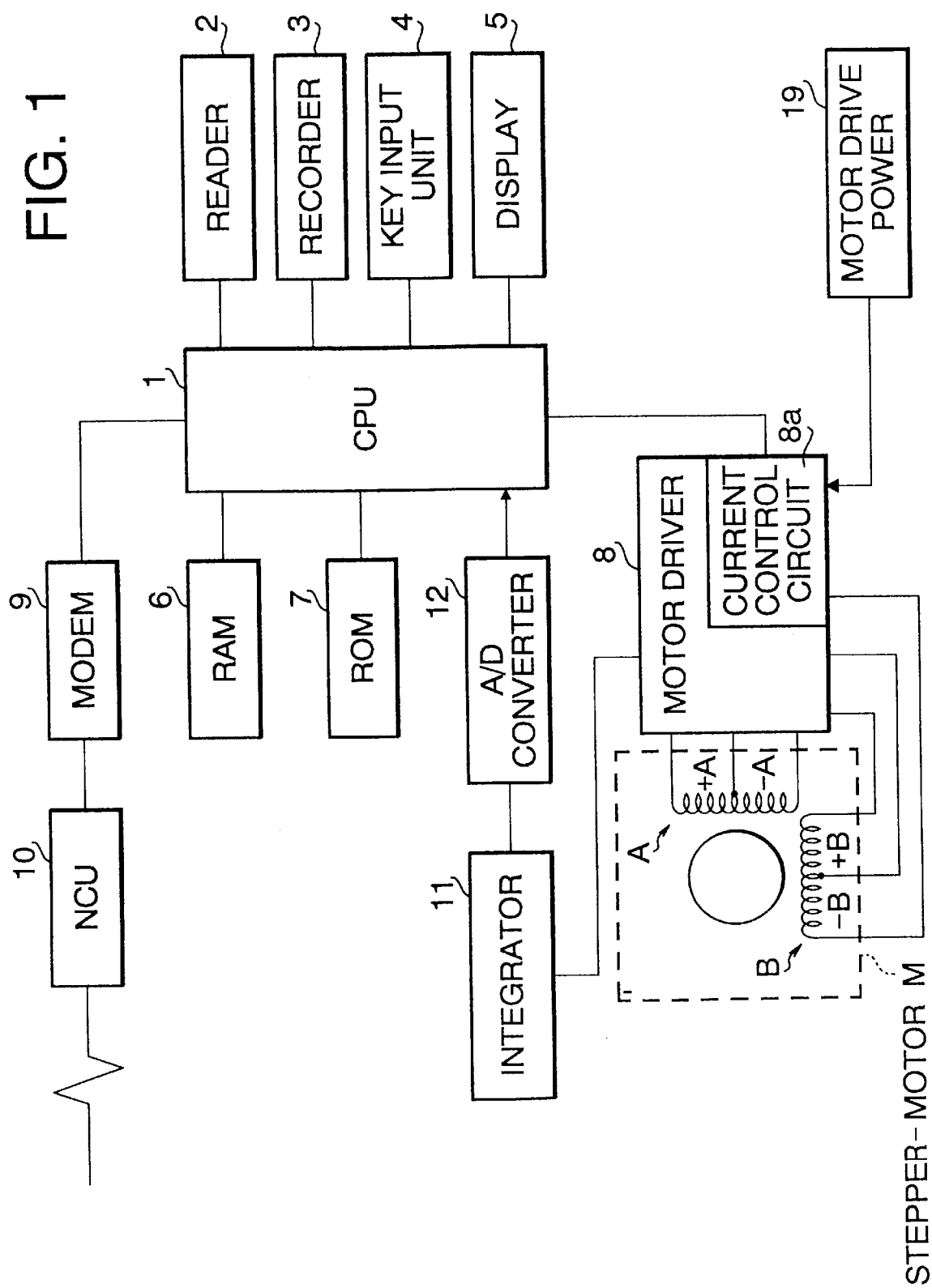
FIG. 1 is a block diagram showing a circuit structure of a facsimile device using a stepper-motor of the present invention.

Referring to FIG. 1, illustrated is a block diagram of a circuit structure of a facsimile device using a stepper-motor of the present invention. CPU 1 controls the operations of the facsimile device. Scanner 2 scans the image data on the document surface. Recording or printing part 3 records the image data on the paper. Key input part 4 is provided for carrying out the input of a third parties facsimile number and the like. Display 5 is provided for displaying the operational conditions of the facsimile device. The scanner 2, recording part 3, key input part 4 and display 5 are connected to the CPU 1 respectively.

RAM 6 temporarily stores the image data. ROM 7 stores the programs for control of various operations of the facsimile device. Both RAM 6 and ROM 7 are connected to the CPU 1. Modem 9 carries out modulation and demodulation of the image data that is transmitted and received and is connected to the CPU 1. NCU 10, which is for transmission of dial pulses corresponding to a third parties facsimile number and for detection of incoming signal from a third party, is connected to the modem 9.

Stepper-motor M is arranged for transport of a document or recording paper. Motor driver 8 is for supplying drive current to said stepper-motor M. Current control circuit 8a is a circuit for controlling the amount of current supplied from a motor drive source 19 and is arranged inside the motor driver 8. The motor driver 8 is connected to the CPU 1 and the stepper-motor M is connected to the motor driver 8. The stepper-motor M is a two-phase stepper-motor and is arranged with two coils +A/-A in the A phase and another two coils +B/-B in the B phase such that the flow directions of the current in the coils are opposite.

When a document or recording paper is transported by the driving of the stepper motor M, the CPU 1 transmits a signal to the motor driver 8. Upon receiving the signal from the CPU 1, the motor driver 8 changes the excitation pattern of the A and B phases of the stepper-motor M and starts the transportation of the document or recording paper.

Figure 6:
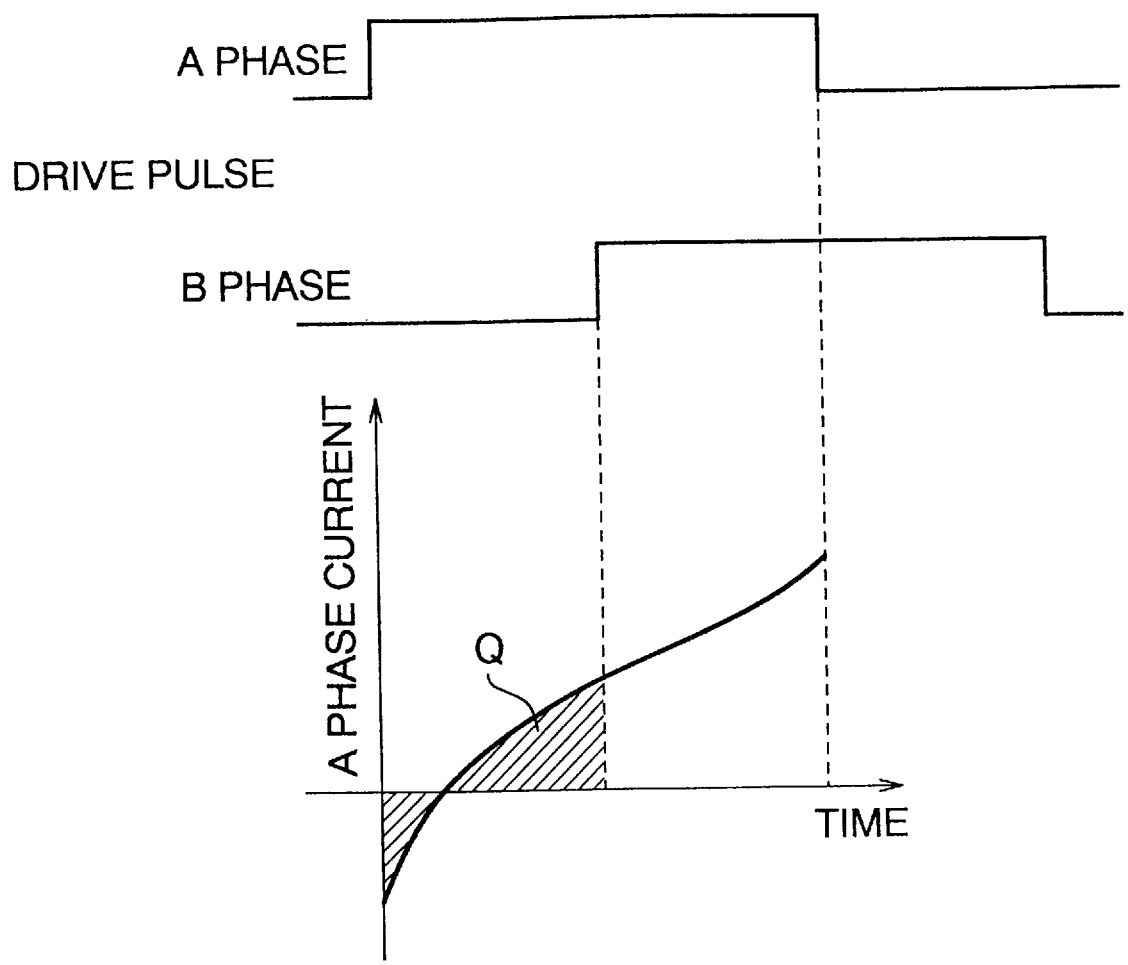
FIG. 6 shows the integrated value of the amount of supplied current at A phase when both A and B phases are excited.

Integrator 11 is a circuit for measuring integration of current (referred to as current integral value Q) which has flowed in a particular one of the four coils +A/-A/+B/-B (for example, coil +A) from the change of the excitation pattern of one phase (for example, the A phase) to the change to that of the other phase (B phase) (see the diagonally lined part "Q" of FIG. 6). A/D converter 12 is a device for converting to a digital signal the value of the current integral value Q output from the integrator 11 and transmitting to the CPU 1 the resulting digital signal which corresponds to the analog value Q.

Figure 2:
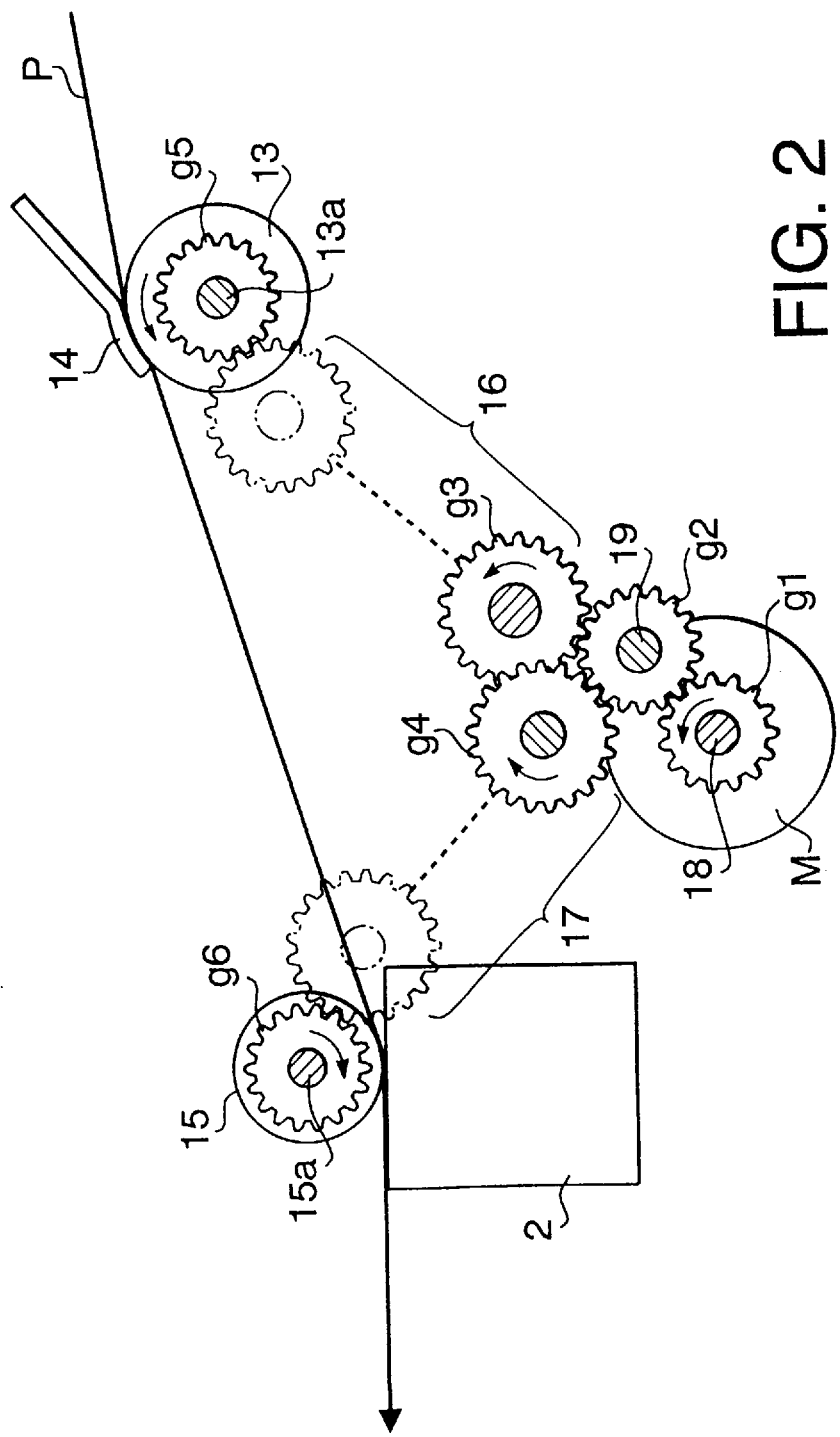
FIG. 2 is a schematic view of a document transport system of the facsimile device shown in FIG. 1.

FIG. 2 is an outline diagram of the system for transporting a document using the stepper-motor M. A motor gear g1 is attached to the rotating shaft 18 of the stepper-motor M. The motor gear g1 engages an idle gear g2. This idle gear g2 engages a separation roller gear g5 attached to a shaft 13a via a first gear series 16 comprising a plurality of gears including a gear g3. A separation roller 13 is attached to that shaft 13a and a separation pad 14 is in contact with that separation roller 13.

The idle gear g2 engages with a platen roller gear g6 attached to a shaft 15a via a second gear series 17 comprising a plurality of gears including a gear g4. A platen roller 15 is attached to the shaft 15a and the contact image sensor (CIS) 2 is in contact with that platen roller 15.

When a document P is to be transported by the system described above, the rotation of that stepper-motor M is transmitted to the separation roller 13 via the idle gear g2, first gear series 16 and separation roller gear g5. When the separation roller 13 receives the rotation from the stepper-motor M, it starts rotating in the counter clockwise direction in FIG. 2 and sends the document P in the direction of the scanner 2. The rotation of the stepper-motor M is also transmitted to the platen roller 15 via the idle gear g2, second gear series 17 and platen roller gear g6. When the platen roller 15 receives the rotation from the stepper-motor M, it starts rotating in the clockwise direction in FIG. 2 and transports the document P to the scanner 2 in a close contact manner.

Figure 3:
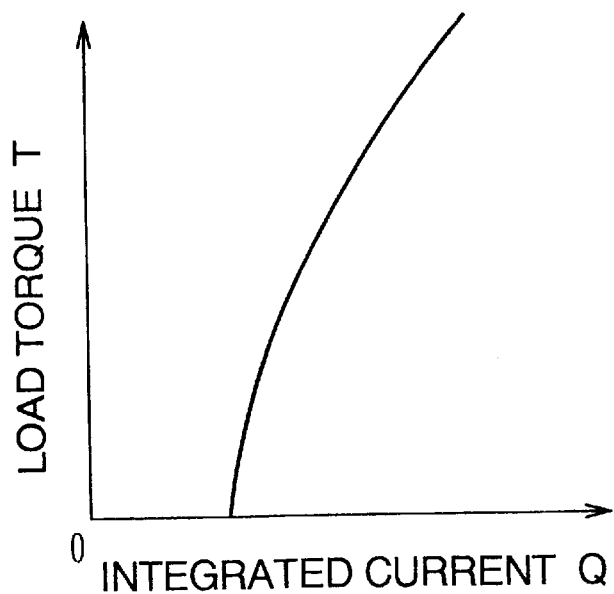
FIG. 3 is a diagram showing the relationship between the load torque and current integrated value.

When the document P is transported by the system shown in FIG. 2, a friction resistance is generated between the document P and the separation roller 13, between the document P and the platen roller 15 and between each pair of the gears. Due to this friction, a load torque T in response to the rotation is applied to the stepper-motor M. The larger the load torque T, the larger the integrated amount of current supplied to each coil +A/-A/+B/-B from the time when the supply of current starts, and the load torque T corresponds 1 to 1 with the current integral value Q (see FIG. 3). The relationship between the load torque T and the current integral value Q is stored in the ROM 7 as a first table t1 of operation control of the facsimile device.

Figure 4:
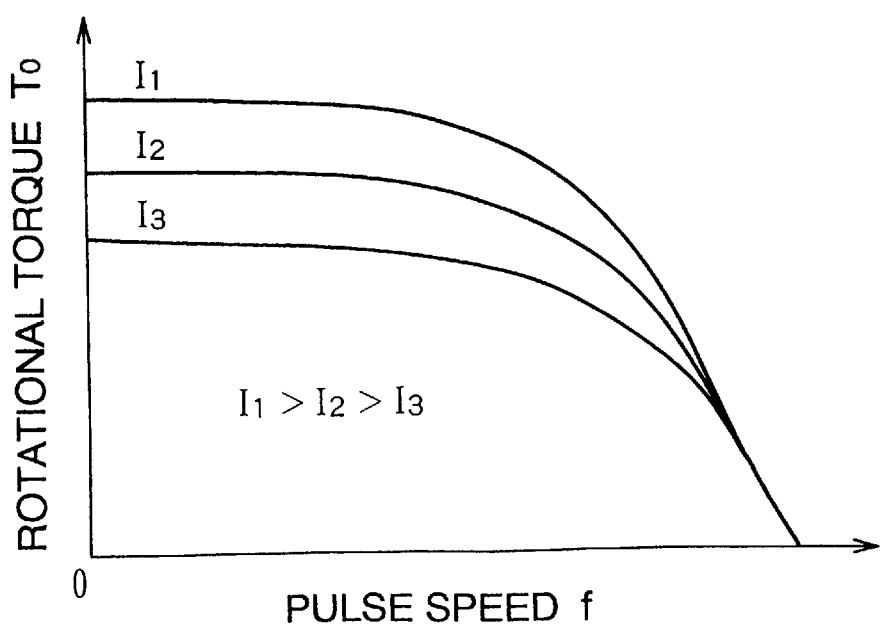
FIG. 4 is a diagram showing the relationship between the amount of supplied current, pulse speed and rotational torque.

On the stepper-motor M, there is also a characteristic relationship (see FIG. 4) between the current amount (below referred to as supplied current amount I) that is supplied to each of the coils +A/-A/+B/-B and the rotation torque TO of the stepper-motor M. The relationship between the supply current amount I and the rotation torque TO under a fixed pulse speed f is also stored in the ROM 7 as a second table t2 of the operation control of the facsimile device.

When transporting the document P, the CPU 1 determines the current value from the table t2 and transmits a signal corresponding to the read current value to the motor driver 8 so the stepper-motor M is rotated by a predetermined rotation torque TO under the aforementioned fixed pulse speed f. The current value read at this time is temporarily stored in the RAM 6.

When the motor driver 8 receives the signal from the CPU 1, the current control circuit 8a controls the applied current amount I that is supplied to each coil +A/-A/+B/-B from the motor drive source 19 based on the aforementioned signal. Then, the current controlled by the current control circuit 8a is supplied to each coil +A/-A/+B/-B in accordance with the excitation pattern.

When the current is supplied to each coil +A/-A/+B/-B as described above and the stepper-motor M starts rotating, the integrator 11 detects the aforementioned current integral value Q and inputs the detection value to the A/D converter 12. The A/D converter 12 converts the input current integral value Q to a digital signal and outputs it to the CPU 1. When the CPU 1 receives this digital signal, it determines the load torque T using the first table t1 based on that digital signal.

The CPU 1 reads out the necessary data of the differential value between the load torque T and rotation torque TO from the ROM 7 immediately after determining the load torque T from the first table t1. Then the CPU 1 determines the ideal rotation torque TO in response to the load torque T from the load torque T and differential value. The CPU 1 once again reads out the data of the current value from the second table t2 of the ROM 7 based on the result of the determination and transmits a signal corresponding to the read current value data to the current control circuit 8a. The current control circuit 8a receives this signal and controls the current amount supplied from the motor drive source 19 to each coil +A/-A/+B/-B of the stepper-motor M.

Figure 5:
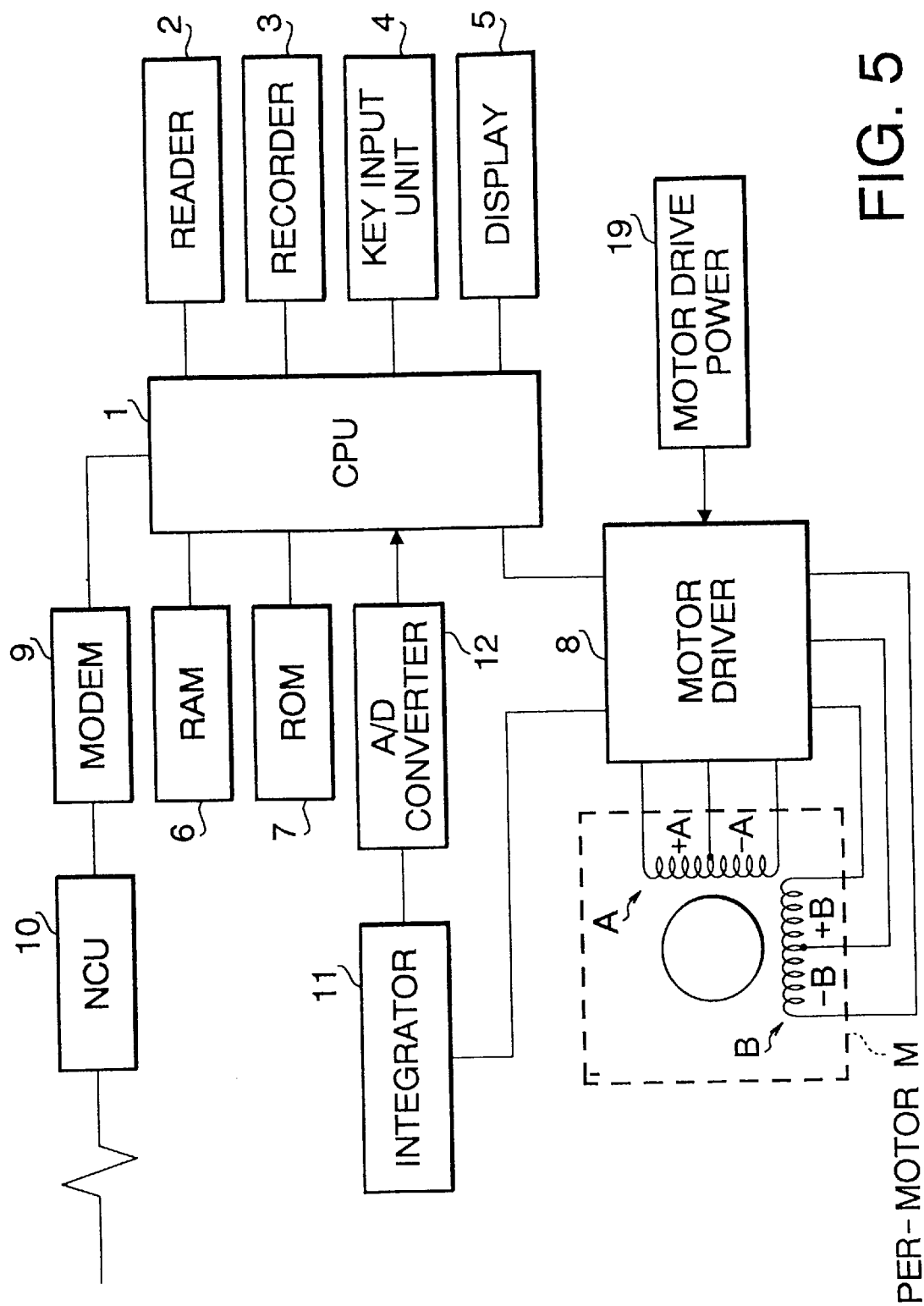
FIG. 5 is a block diagram showing the circuit structure of another facsimile device using the stepper-motor of the present invention.

FIG. 5 is a block diagram showing the circuit structure of another embodiment of the present invention. The stepper-motor M rotates by a predetermined angle every time the excitation pattern of the excitation phase changes. The motor driver 8 receives a pulse signal from the CPU 1 and changes the excitation pattern. If the current amount supplied to each coil +A/−A/+B/−B is fixed, the rotation torque TO of the stepper-motor M decreases as the pulse speed f increases (see FIG. 4).

In this embodiment, instead of the second table t2, the relationship between the pulse speed f and rotation torque TO under the fixed supplied current amount I is stored in the ROM 7 as a fourth table t4 of the operating controls of the facsimile device. The CPU 1 determines the pulse speed f from the table t4 and transmits a signal corresponding to the determined pulse speed f to the motor driver 8 so the stepper-motor M is rotated by a predetermined rotation torque TO under the fixed supplied current amount I.

Afterwards, similar to the previous embodiment shown in FIG. 1, the CPU 1 determines the load torque T from the first table t1 and immediately reads out the data of the differential value between the load torque T and rotation torque TO from the ROM 7. Then, the CPU 1 determines an optimum rotation torque TO relative to the load torque T based on the load torque T and differential value. The CPU 1 once again reads out the data of the current value from the fourth table t4 of the ROM 7 based on the result of that determination and once again transmits a signal corresponding to this pulse speed f to the motor driver 8.

In the present embodiment, the relationship between the load torque T and current integral value Q, the relationship between the supplied current amount I and the rotation torque TO under a fixed pulse speed f and the relationship between the pulse speed f and the rotation torque TO under fixed supplied current amount I are respectively stored in the form of tables in the ROM 7. However, it should be noted that each of the above relationships may be approximated by a function and the load torque T or rotation torque TO may be determined by that approximation.

Also, the stepper-motor control method of the present embodiment can also be applied to a stepper-motor used in the recording part 3 of a facsimile device or used in a drive mechanisms of the cutter system that cuts the recording paper. Furthermore, the stepper-motor control method of the embodiment can also be applied to a stepper-motor used in a printer or copier.

As understood from the foregoing, the load torque exerted on a stepper-motor during driving is detected and based on that load torque an optimum output torque is generated by controlling the amount of current supplied to the excitation phase of the motor or pulse speed. Therefore, an output torque most appropriate to an actual load is generated by the stepper-motor so that the output torque never becomes too large relative to the load torque (i.e., actual torque), no noise is produced and the step-out phenomena does not occur.

What is claimed is:

1. A control method for a stepper-motor, comprising:

(a) determining a present integrated value of a current supplied to the stepper motor;

(b) determining a present load torque applied to the stepper-motor from said present integrated value determined in step (a) using a first table which stores a relationship between plurality of load torques of the stepper-motor and a plurality of integrated values of current supplied to the stepper-motor;

(c) calculating a torque difference between a preset rotational torque of the stepper-motor and the present load torque determined in step (b);

(d) determining one of a feed current or a pulse speed from said torque difference calculated in step (c) using a second table which stores a relationship between a plurality of rotational torques of the stepper-motor and one of a plurality of feed currents of the stepper-motor or a plurality of pulse speeds of the stepper-motor; and (e) controlling an output torque in response to one of the feed current and the pulse speed determined in step (d).

* * * * *